US012631220B2

(12) United States Patent
Uehara et al.

(10) Patent No.: US 12,631,220 B2
(45) Date of Patent: May 19, 2026

(54) TORQUE LIMITER AND POWER TRANSMISSION DEVICE

(71) Applicant: EXEDY Corporation, Neyagawa (JP)

(72) Inventors: Hiroshi Uehara, Neyagawa (JP); Hiroaki Kato, Neyagawa (JP); Yusuke Nagaoka, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 314 days.

(21) Appl. No.: 18/354,795

(22) Filed: Jul. 19, 2023

(65) Prior Publication Data

US 2024/0068525 A1 Feb. 29, 2024

(30) Foreign Application Priority Data

Aug. 24, 2022 (JP) ................................. 2022-133440

(51) Int. Cl.
*F16D 7/02* (2006.01)
*F16F 15/129* (2006.01)
*F16D 3/12* (2006.01)

(52) U.S. Cl.
CPC .......... *F16D 7/025* (2013.01); *F16F 15/1297* (2013.01); *F16D 3/12* (2013.01)

(58) Field of Classification Search
CPC ......... F16D 7/025; F16D 3/12; F16F 15/1297
USPC ...................................... 464/46, 68.1
See application file for complete search history.

(56) References Cited

U.S. PATENT DOCUMENTS 8,657,690 B2 * 2/2014 Doman ................... F16D 7/025
464/46
9,127,720 B2 * 9/2015 Saeki .................. F16F 15/1297

FOREIGN PATENT DOCUMENTS

JP 2021055810 A 4/2021

* cited by examiner

*Primary Examiner* — Greg Binda
(74) *Attorney, Agent, or Firm* — United IP Counselors, LLC

(57) ABSTRACT

A torque limiter includes a first side plate, a second side plate, a friction disc, a pressure plate, and a biasing member. The first side plate includes an attachment surface. The attachment surface faces in an axial direction so as to be attached to a flywheel. The second side plate has a smaller outer diameter than the outer diameter of the first side plate. The second side plate is disposed so as to not overlap the attachment surface as seen in an axial direction. The second side plate is attached to the first side plate.

6 Claims, 10 Drawing Sheets

SECOND AXIAL SIDE ← AXIAL DIRECTION → FIRST AXIAL SIDE

SECOND
AXIAL SIDE          AXIAL DIRECTION          FIRST
                                            AXIAL SIDE

SECOND
AXIAL SIDE ⟷ AXIAL DIRECTION ⟶ FIRST
AXIAL SIDE

SECOND
AXIAL SIDE

AXIAL DIRECTION

FIRST
AXIAL SIDE

100

VIII

VIII

SECOND AXIAL SIDE ←⎯⎯⎯→ FIRST AXIAL SIDE

AXIAL DIRECTION

SECOND AXIAL SIDE    ←    AXIAL DIRECTION    →    FIRST AXIAL SIDE

51

52

54

53

55

O — — — — — — — — — O

SECOND
AXIAL SIDE ← AXIAL DIRECTION → FIRST
AXIAL SIDE

TORQUE LIMITER AND POWER TRANSMISSION DEVICE

CROSS-REFERENCE TO RELATED APPLICATIONS

This application is based on and claims the priority benefit of Japanese application 2022-133440 filed Aug. 24, 2022, the contents of which are incorporated herein by reference.

TECHNICAL FIELD

The present invention relates to a torque limiter and a power transmission device.

BACKGROUND

Power transmission devices are configured to absorb torque fluctuation of an engine, a motor, and the like. Power transmission devices include a flywheel, a torque limiter unit, and a damper unit (e.g., as illustrated in Patent Literature 1). The damper unit is attached to the flywheel via the torque limiter unit. The torque limiter unit is configured to restrict transmission of torque of a predetermined magnitude or more, between the flywheel and the damper unit.

Patent Literature 1: JP 2021-55810A

SUMMARY OF THE INVENTION

It is preferable that a space for installing the power transmission device configured as described above is as small as possible. In view of this, an object of the present invention is to provide a torque limiter capable of reducing an installation space in an axial direction.

A torque limiter according to a first aspect is configured to be attached to a flywheel. The torque limiter includes a first side plate, a second side plate, a friction disc, a pressure plate, and a biasing member. The first side plate includes an attachment surface. The attachment surface faces in an axial direction so as to be attached to a flywheel. The second side plate has a smaller outer diameter than an outer diameter of the first side plate. The second side plate is disposed so as to not overlap the attachment surface as seen in an axial direction. The second side plate is attached to the first side plate. The friction disc is disposed between the first side plate and the second side plate in the axial direction. The pressure plate is in contact with the friction disc. The biasing member biases the pressure plate toward the friction disc.

Conventionally, both the first side plate and the second side plate are configured to be attached to the flywheel. On the other hand, a torque limiter according to a first aspect is configured to facilitate only the first side plate being attached to the flywheel. For this reason, compared to a conventional torque limiter, it is possible to reduce an installation space in the axial direction by the thickness of the second side plate.

A torque limiter according to a second aspect is the torque limiter according to the first aspect that further includes a first fastening member. The first fastening member fastens the first side plate and the second side plate to each other. The first fastening member is disposed radially inward of the attachment surface. With this configuration, when it is necessary to form a recessed portion for avoiding interference with the first fastening member in the flywheel, the recessed portion can be formed radially inward. For this reason, a decrease in the inertia amount due to forming the recessed portion can be suppressed.

A torque limiter according to a third aspect is the torque limiter according to the second aspect that employs the following configuration. The first side plate includes a first outer circumferential portion including the attachment surface, a first inner circumferential portion, and a first coupling portion extending in the axial direction so as to couple the first outer circumferential portion to the first inner circumferential portion. The first coupling portion includes a first recessed portion. The first recessed portion opposes the first fastening member. The first recessed portion is recessed radially inward. With this configuration, since the first recessed portion is formed, the first fastening member can be disposed radially inward by a corresponding amount. As a result of this, when it is necessary to form a recessed portion for avoiding interference with the first fastening member in the flywheel, the recessed portion can be formed further radially inward. For this reason, a decrease in the inertia amount due to the provision of the recessed portion can be further suppressed.

A torque limiter according to the fourth aspect is the torque limiter according to the second or third aspect that employs the following configuration. The second side plate includes a second outer circumferential portion, a second inner circumferential portion, and a second coupling portion extending in the axial direction so as to couple the second outer circumferential portion to the second inner circumferential portion. The second coupling portion includes a second recessed portion recessed radially inward. The second recessed portion opposes the first fastening member. With this configuration, since the second recessed portion is formed, the first fastening member can be disposed further radially inward by that amount. As a result of this, when it is necessary to form a recessed portion for avoiding interference with the first fastening member in the flywheel, the recessed portion can be formed further radially inward, and thus a decrease in the inertia amount can be further suppressed.

A torque limiter according to the fifth aspect is the torque limiter according to any one of the first to fourth aspects that employs the following configuration. The first side plate is thicker than the second side plate.

A torque limiter according to the sixth aspect is the torque limiter according to the fifth aspect that employs the following configuration. The pressure plate includes a claw portion extending toward the first side plate. The first side plate includes an insertion hole for insertion of the claw portion.

A torque limiter according to the seventh aspect is the torque limiter according to the sixth aspect that employs the following configuration. The first side plate includes a first outer circumferential portion, a first inner circumferential portion, and a first coupling portion. The insertion hole is formed in the first coupling portion.

A torque limiter according to the eighth aspect is the torque limiter according to any one of the first to seventh aspects that employs the following configuration. The second side plate is thicker than the first side plate.

A torque limiter according to the ninth aspect is the torque limiter according to the eighth aspect that employs the following configuration. The pressure plate includes a claw portion extending toward the second side plate. The second side plate includes an insertion hole for insertion of the claw portion.

A torque limiter according to the tenth aspect is the torque limiter according to the ninth aspect that employs the following configuration. The second side plate includes a second outer circumferential portion, a second inner circumferential portion, and a second coupling portion. The insertion hole is formed in the second coupling portion.

A torque limiter according to the eleventh aspect is the torque limiter according to any one of the second to fourth aspects that employs the following configuration. The flywheel includes a flexible plate, an inertia ring, and a fastening member. The inertia ring is attached to an outer circumferential portion of the flexible plate. The fastening member fastens the inertia ring to the flexible plate. An inner circumferential portion of the inertia ring includes a fastening recessed portion for fastening by the fastening member. The first fastening member overlaps the fastening recessed portion as seen in the axial direction.

A power transmission device according to the twelfth aspect includes the torque limiter according to any one of the first to the eleventh aspects, and a damper unit attached to the torque limiter.

According to the present invention, a torque limiter capable of reducing an installation space in the axial direction can be provided.

DESCRIPTION OF EMBODIMENTS

Overall Configuration

Figure 1:
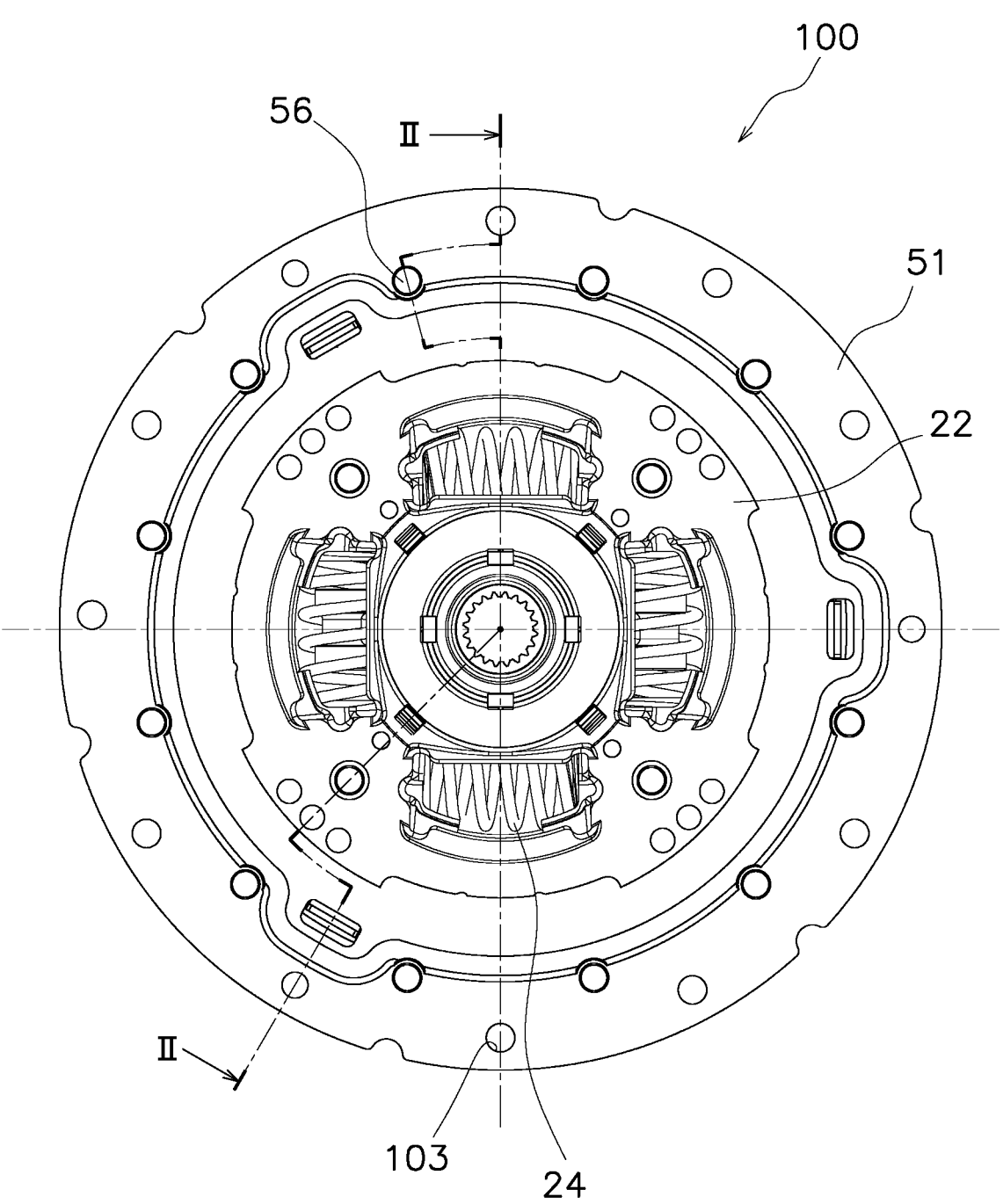
FIG. 1 is a front view of an embodiment of a power transmission device in accordance with the claimed invention.
Figure 2:
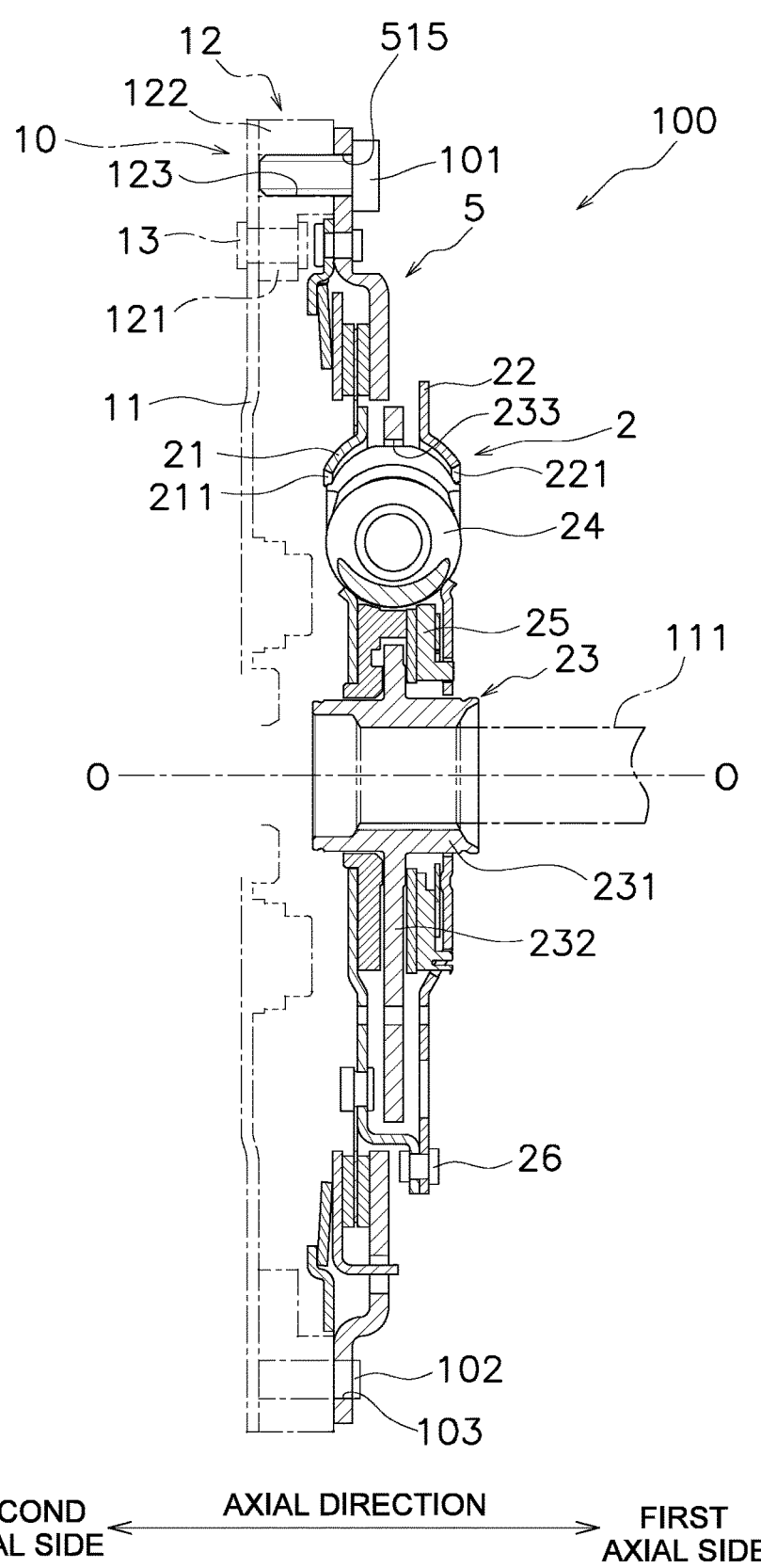
FIG. 2 is a cross-sectional view taken along the zigzag line II-II in FIG. 1.

FIG. 1 is a front view of a power transmission device 100 according to the present embodiment, and FIG. 2 is a cross sectional view taken along line II-II in FIG. 1. In FIG. 2, a line O-O is a rotational axis of the power transmission device 100. In FIG. 2, an engine (not shown) is disposed on the left side with respect to the power transmission device 100, and a drive unit (not shown) including a motor, a speed shifter, and the like is disposed on the right side with respect to the power transmission device 100.

Note that in the following description, the "axial direction" refers to the direction in which a rotational axis O of the power transmission device 100 extends. The "circumferential direction" refers to the circumferential direction of a circle centered about the rotational axis O, and the "radial direction" refers to the radial direction of the circle centered about the rotational axis O. Note that the circumferential direction need not necessarily exactly match the circumferential direction of the circle centered about the rotational axis O, and the radial direction need not necessarily exactly match the diameter direction of the circle centered about the rotational axis O.

As shown in FIGS. 1 and 2, the power transmission device 100 is provided between the engine and an input shaft 111 of the drive unit. The power transmission device 100 is configured to limit torque transmitted between the engine and the drive unit, and attenuate rotational fluctuation. The power transmission device 100 includes a flywheel 10, a torque limiter 5, and a damper unit 2.
Flywheel The flywheel 10 is disposed so as to be rotatable around the rotational axis O. The flywheel 10 includes a flexible plate 11 and an inertia ring 12. The flexible plate 11 has a disc-like shape.

The inertia ring 12 is disposed on the outer circumferential portion of the flexible plate 11. The inertia ring 12 has an annular shape extending in the circumferential direction. The inertia ring 12 is disposed on the first axial side with respect to the flexible plate 11.

The inertia ring 12 has an inner circumferential portion 121 and an outer circumferential portion 122. The inner circumferential portion 121 is recessed toward the second axial side with respect to the outer circumferential portion 122. The entirety of the inner circumferential portion 121 is recessed toward the second axial side with respect to the outer circumferential portion 122. When the entirety of the inner circumferential portion 121 is recessed as above, the entirety of the inner circumferential portion 121 corresponds to a fastening recessed portion. Note that the inner circumferential portion 121 may be partially recessed toward the second axial side with respect to the outer circumferential portion 122. In this case, the recessed portions of the inner circumferential portion 121 correspond to the fastening recessed portions. The fastening recessed portion is a recessed portion for fastening using fastening members 13 (described later).

The outer circumferential portion 122 of the inertia ring 12 has a plurality of screw holes 123. The plurality of screw holes 123 are arranged in the circumferential direction. Also, the outer circumferential portion 122 of the inertia ring 12 has a plurality of knock pins 102. The plurality of knock pins 102 are arranged in the circumferential direction. The knock pins 102 protrude toward the first axial side. By inserting these knock pins 102 into knock pin holes 103 formed in the outer circumferential portion of the torque limiter 5, the torque limiter 5 is positioned relative to the flywheel 10.

The flywheel 10 includes a plurality of fastening members 13. The plurality of fastening members 13 are arranged in the circumferential direction. The fastening members 13 may be rivets, for example. Note that the fastening members 13 may be nuts and bolts, or the like. The fastening members 13 fasten the inertia ring 12 to the flexible plate 11 in the inner circumferential portion 121. Note that when the inner circumferential portion 121 is partially recessed, the fastening members 13 are disposed in the recessed portions.
Torque Limiter The torque limiter 5 is configured to be attached to the flywheel 10. Specifically, an outer circumferential portion of the torque limiter 5 is attached to the inertia ring 12 of the flywheel 10.

The torque limiter 5 is disposed radially outward of the damper unit 2. The torque limiter 5 is configured to restrict torque transmitted between the flywheel 10 and the damper unit 2. In other words, the torque limiter 5 is configured to restrict the transmission of torque of a predetermined magnitude or more.

Figure 3:
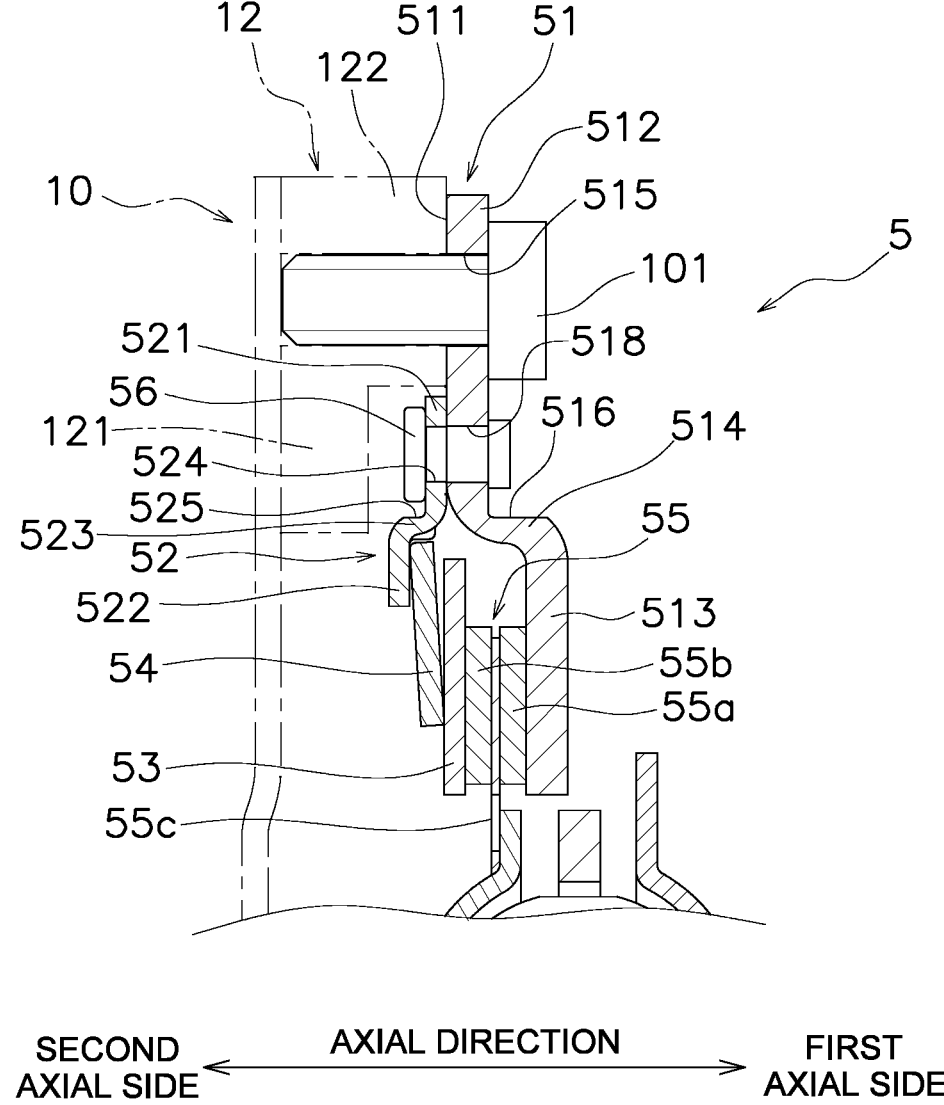
FIG. 3 is an enlarged sectional view of a torque limiter unit.
Figure 4:
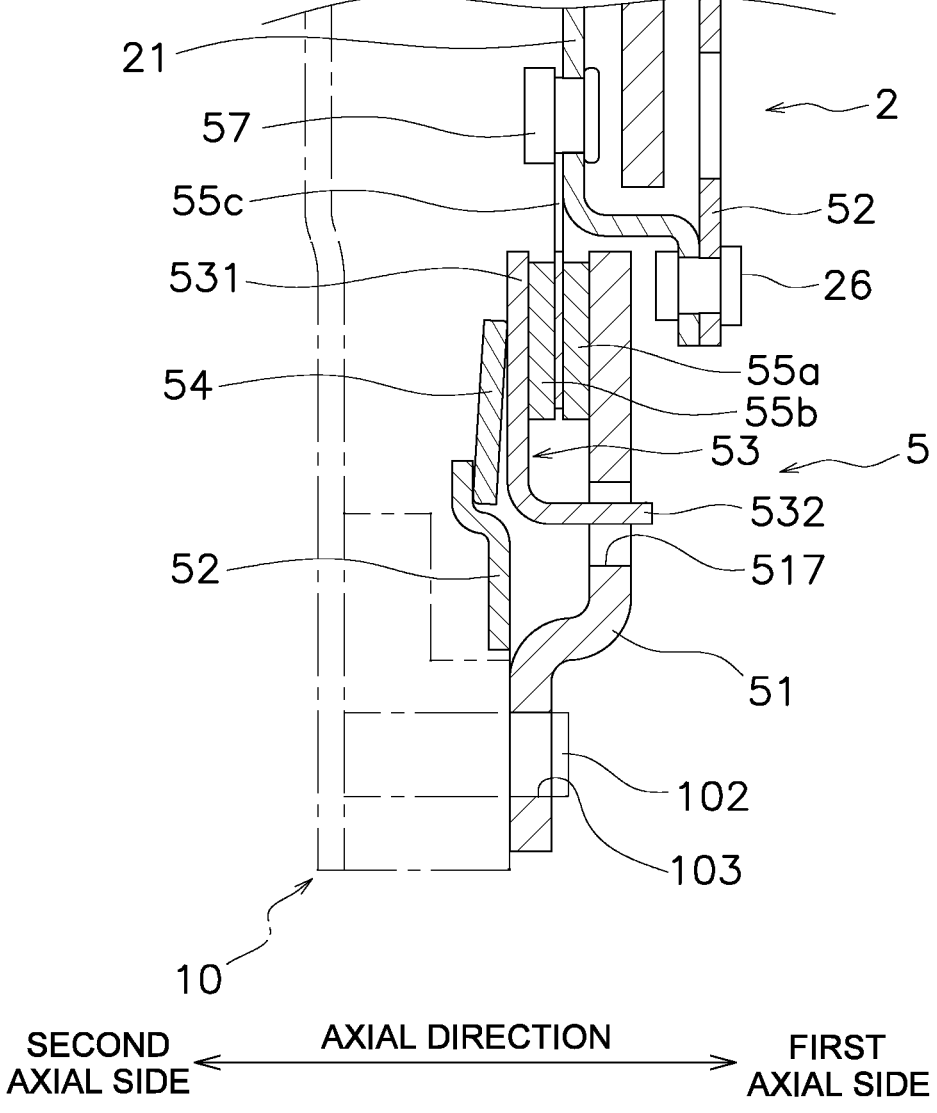
FIG. 4 is an enlarged sectional view of the torque limiter unit.

As shown in FIGS. 3 and 4, the torque limiter 5 includes a first side plate 51, a second side plate 52, a pressure plate 53, a cone spring 54 (an example of biasing member), and a friction disc 55.

First Side Plate

Figure 5:
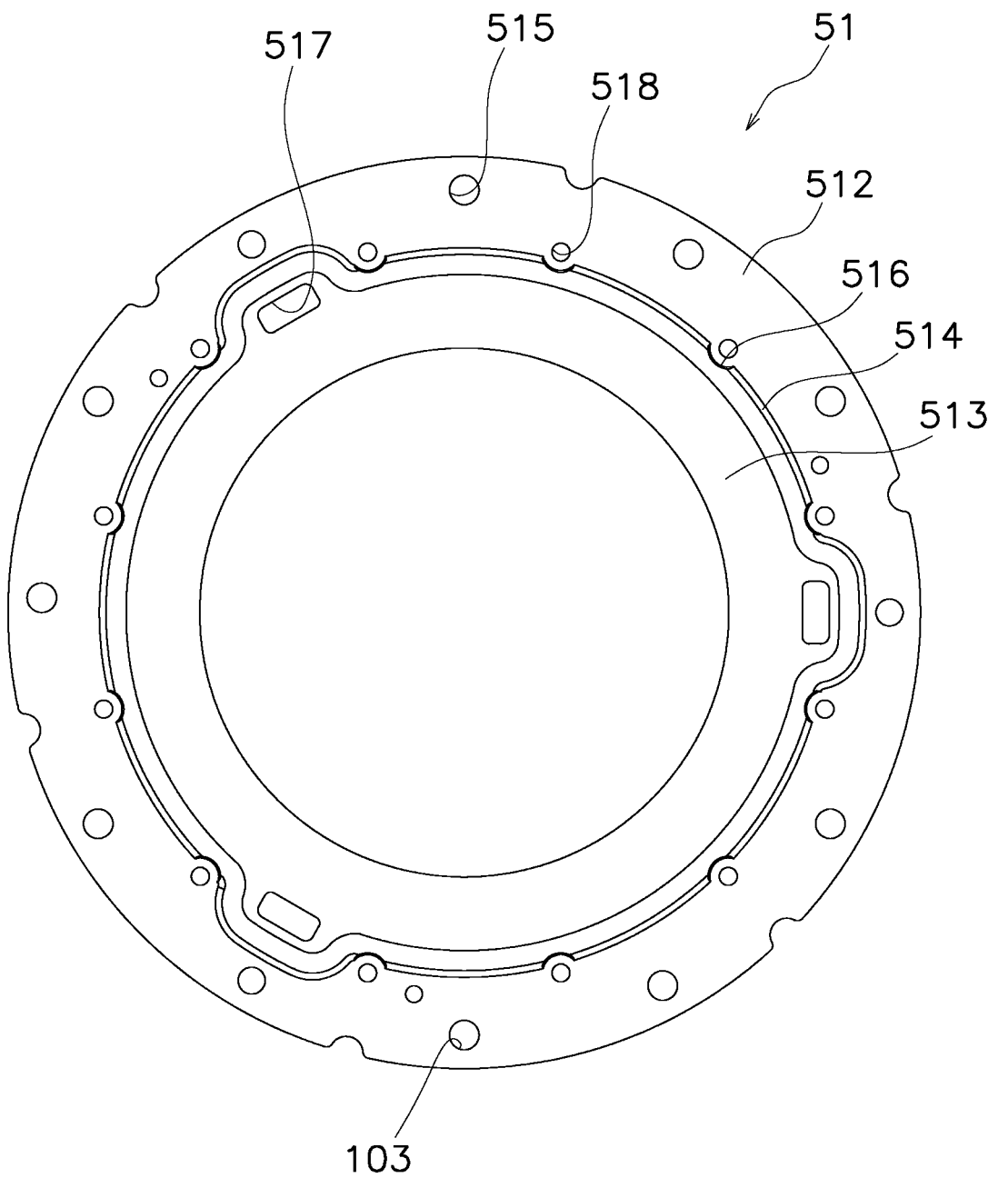
FIG. 5 is a front view of a first side plate.

FIG. 5 is a front view of the first side plate 51 as seen from the first axial side. As shown in FIGS. 3 to 5, the first side plate 51 has an annular shape. The first side plate 51 is disposed on the first axial side with respect to the flywheel 10. The first side plate 51 is attached to the flywheel 10. Specifically, the first side plate 51 is attached to the inertia ring 12 of the flywheel 10.

The first side plate 51 has an attachment surface 511. The attachment surface 511 faces toward the second axial side. In other words, the attachment surface 511 faces toward the flywheel 10. The attachment surface 511 is a surface that is to be attached to the flywheel 10. The attachment surface 511 is in contact with the flywheel 10 when the first side plate 51 is attached to the flywheel 10. The attachment surface 511 has an annular shape.

The first side plate 51 has a first outer circumferential portion 512, a first inner circumferential portion 513, and a first coupling portion 514. The first inner circumferential portion 513 of the first side plate 51 is subjected to a biasing force from the cone spring 54.

The first outer circumferential portion 512 is configured to be attached to the flywheel 10. The first outer circumferential portion 512 includes an attachment surface 511. The first outer circumferential portion 512 has a plurality of through holes 515 into which bolts 101 are to be inserted. The plurality of through holes 515 are arranged in the circumferential direction.

Also, the first outer circumferential portion 512 has a plurality of rivet holes 518. The plurality of rivet holes 518 are arranged in the circumferential direction. The rivet holes 518 are arranged radially inward of the through holes 515. The P.C.D (Pitch Circle Diameter) of the plurality of rivet holes 518 is smaller than the P.C.D of the plurality of through holes 515.

The first inner circumferential portion 513 is disposed on the first axial side with respect to the first outer circumferential portion 512. The first inner circumferential portion 513 includes a plurality of insertion holes 517. The plurality of insertion holes 517 are arranged in the circumferential direction. The insertion holes 517 are open in the axial direction. Note that portions of the first inner circumferential portion 513 where the insertion holes 517 are formed bulge radially outward.

The first coupling portion 514 has a cylindrical shape extending in the axial direction. The first coupling portion 514 couples the first inner circumferential portion 513 to the first outer circumferential portion 512. The first coupling portion 514 has a plurality of first recessed portions 516. The first recessed portions 516 oppose first fastening members 56 (described later) in the radial direction. The first recessed portions 516 are recessed radially inward. The first recessed portions 516 face radially outward. The first recessed portions 516 extend in the axial direction, along the first coupling portion 514.

Second Side Plate

Figure 6:
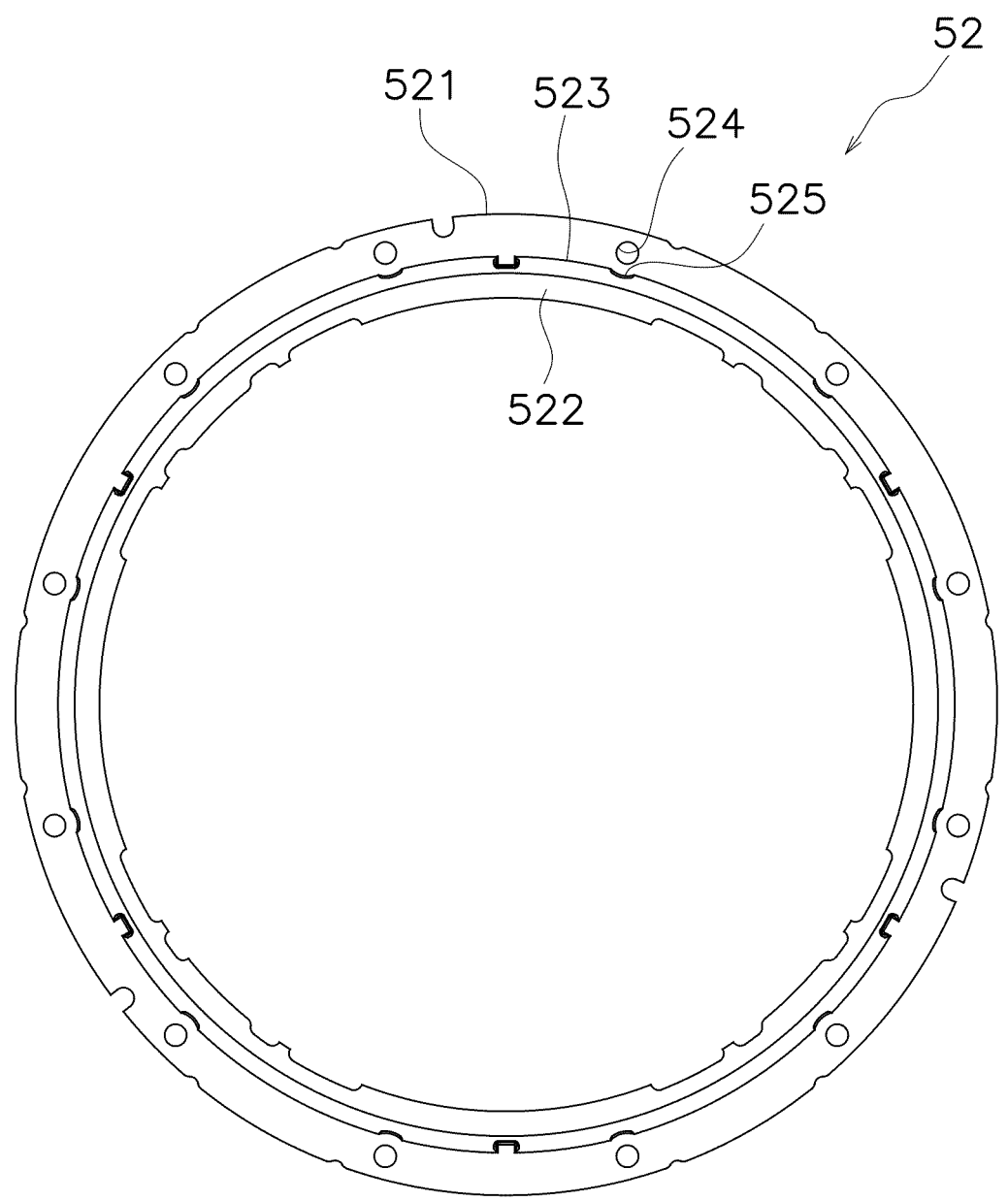
FIG. 6 is a front view of a second side plate.

FIG. 6 is a front view of the second side plate 52 as seen from the second axial side. As shown in FIGS. 3, 4, and 6, the second side plate 52 is attached to the first side plate 51. Specifically, the first side plate 51 is attached to the second side plate 52 using the first fastening members 56. The second side plate 52 rotates integrally with the first side plate 51. In the present embodiment, the first side plate 51 is thicker than the second side plate 52. The second side plate 52 is disposed on the second axial side with respect to the first side plate 51.

The first fastening members 56 are disposed radially inward of the attachment surface 511. The first fastening members 56 overlap the fastening recessed portion of the inertia ring 12 as seen in the axial direction. The first fastening members 56 oppose the inner circumferential portion 121 of the inertia ring 12 in the axial direction. With this configuration, the need to form a recessed portion in the inertia ring 12 only to avoid interference between the first fastening members 56 and the inertia ring 12 is eliminated. As a result of this, work involved in processing the inertia ring 12 can be reduced.

The first fastening members 56 may be rivets, for example. Note that the first fastening members 56 may also be nuts and bolts. The head of each first fastening member 56 is disposed on the second side plate 52 side, and a crimped part of the first fastening member 56 is disposed on the first side plate 51 side. Note that a configuration is also possible in which the head of each first fastening member 56 is disposed on the first side plate 51 side, and a crimped part of the first fastening member 56 is disposed on the second side plate 52 side.

The second side plate 52 has an annular shape. The outer diameter of the second side plate 52 is smaller than the outer diameter of the first side plate 51. Also, the inner diameter of the second side plate 52 is larger than the inner diameter of first side plate 51.

The second side plate 52 is disposed so as not to overlap the attachment surface 511 as seen in the axial direction. Accordingly, the attachment surface 511 of the first side plate 51 is in contact with the flywheel 10. In the state where the torque limiter 5 is not attached to the flywheel 10, the attachment surface 511 of the first side plate 51 is exposed.

As seen in the radial direction, the second side plate 52 overlaps the flywheel 10, specifically, the inertia ring 12, and more specifically, the outer circumferential portion 122 of the inertia ring 12. The outer circumferential surface of the second side plate 52 opposes the flywheel 10, specifically, the inertia ring 12, and more specifically, the outer circumferential portion 122 of the inertia ring 12.

The second side plate 52 has a second outer circumferential portion 521, a second inner circumferential portion 522, and a second coupling portion 523. The second outer circumferential portion 521 of the second side plate 52 is configured to be attached to the first side plate 51. Specifically, the second outer circumferential portion 521 has a plurality of rivet holes 524. The rivet holes 524 of the second side plate 52 are in communication with the rivet holes 518 of the first side plate 51. The first side plate 51 is fastened to the second side plate 52 with the first fastening members 56 that extend through the rivet holes 518 of the first side plate 51 and the rivet holes 524 of the second side plate 52.

The second outer circumferential portion 521 of the second side plate 52 is in contact with the first outer circumferential portion 512 of the first side plate 51. On the other hand, the second inner circumferential portion 522 of the second side plate 52 is disposed spaced apart from the first inner circumferential portion 513 of the first side plate 51 in the axial direction. Specifically, the second inner circumferential portion 522 of the second side plate 52 is disposed on the second axial side with respect to the second outer circumferential portion 521. The second inner circumferential portion 522 is disposed spaced apart from the first inner circumferential portion 513 in the axial direction. The thickness of the second side plate 52 is smaller than the thickness of the first side plate 51.

The second coupling portion 523 has a cylindrical shape extending in the axial direction. The second coupling portion 523 couples the second inner circumferential portion 522 to the second outer circumferential portion 521. The second coupling portion 523 has a plurality of second recessed portions 525. The second recessed portions 525 oppose the first fastening members 56. The second recessed portions 525 are recessed radially inward. The second recessed portions 525 face radially outward. The second recessed portions 525 extend in the axial direction, along the second coupling portion 523.

Friction Disc

As shown in FIGS. 3 and 4, the friction disc 55 includes a first friction material 55$a$, a second friction material 55$b$, and a friction plate 55$c$. The friction disc 55 is disposed between the first side plate 51 and the second side plate 52 in the axial direction. Specifically, the friction disc 55 is disposed between the first inner circumferential portion 513 and the second inner circumferential portion 522 in the axial direction.

The friction plate 55$c$ has an annular shape. The friction plate 55$c$ is configured so as to rotate integrally with a first and second input plates 21 and 22 (described later). Specifically, the friction plate 55$c$ is attached to the first input plate 21. The friction plate 55$c$ is disposed on the second axial side with respect to the first input plate 21. The friction plate 55$c$ is thinner than the first input plate 21. The friction plate 55$c$ is disposed between the first side plate 51 and the second side plate 52 in the axial direction.

The friction plate 55$c$ is fastened to the damper unit 2 using the second fastening members 57. Specifically, the friction plate 55$c$ is fastened to the first input plate 21 using the second fastening members 57. The second fastening members 57 are disposed radially inward of third fastening members 26 (described later). Note that the second fastening members 57 may be rivets, for example.

The first and second friction materials 55$a$ and 55$b$ have an annular shape. The first friction material 55$a$ is disposed between the friction plate 55$c$ and the first side plate 51 in the axial direction. The second friction material 55$b$ is disposed between the friction plate 55$c$ and the second side plate 52 in the axial direction. Specifically, the second friction material 55$b$ is disposed between the friction plate 55$c$ and the pressure plate 53 in the axial direction.

The first and second friction materials 55$a$ and 55$b$ are attached to the friction plate 55$c$. The first friction material 55$a$ is frictionally engaged with the first side plate 51. Also, the second friction material 55$b$ is frictionally engaged with the pressure plate 53. Upon receiving torque of a predetermined magnitude or more, the first friction material 55$a$ slides against the first side plate 51 and the second friction material 55$b$ slides against the pressure plate 53. As a result of this, the first side plate 51 and the friction plate 55$c$ rotate relative to each other. Note that the first friction material 55$a$ may be fixed to the first side plate 51 and frictionally engaged with the friction plate 55$c$. Also, the second friction material 55$b$ may be fixed to the pressure plate 53 and frictionally engaged with the friction plate 55$c$.

Pressure Plate

The pressure plate 53 has an annular shape. The pressure plate 53 is disposed between the first side plate 51 and the second side plate 52 in the axial direction. Specifically, the pressure plate 53 is disposed between the friction disc 55 and the cone spring 54 in the axial direction. The pressure plate 53 is in contact with the friction disc 55. Specifically, the pressure plate 53 is in contact with the second friction material 55$b$.

The pressure plate 53 has a plurality of claw portions 532. The plurality of claw portions 532 are arranged in the circumferential direction. The claw portions 532 axially extend from the body portion 531 of the pressure plate 53 toward the first side plate 51. Specifically, the claw portions 532 axially extend from the outer circumferential end portion of the body portion 531. The claw portions 532 are inserted into the insertion holes 517 of the first side plate 51. In this manner, the pressure plate 53 rotates integrally with the first side plate 51.

Cone Spring

The cone spring 54 is disposed between the second side plate 52 and the pressure plate 53 in the axial direction. Note that the cone spring 54 is in contact with the second inner circumferential portion 522 of the second side plate 52. The cone spring 54 biases the pressure plate 53 toward the friction disc 55. In this manner, the friction disc 55 is sandwiched between the pressure plate 53 and the first side plate 51. Note that the friction disc 55, the pressure plate 53, and the cone spring 54 are arranged in the stated order from the first side plate 51 in the axial direction.

Damper Unit

As shown in FIG. 2, the damper unit 2 is attached to the torque limiter 5. The damper unit 2 is configured to attenuate rotational fluctuation. The damper unit 2 includes a first input plate 21, a second input plate 22, a hub flange 23, and a plurality of elastic members 24. Also, the damper unit 2 includes a hysteresis-generating mechanism 25.

First and Second Input Plates

The first input plate 21 and the second input plate 22 rotate integrally with each other. The first input plate 21 and the second input plate 22 are not capable of moving relative to each other in the axial direction. The first input plate 21 and the second input plate 22 are configured to rotate integrally with the friction plate 55$c$. Specifically, the friction plate 55$c$ is attached to the first input plate 21. Note that the friction plate 55$c$ is a separate member from the first input plate 21, but the friction plate 55$c$ may be configured as a single member that is formed integrally with the first input plate 21. Both the first input plate 21 and the second input plate 22 are annular members having a center hole.

The first input plate 21 and the second input plate 22 are disposed spaced apart from each other in the axial direction. The second input plate 22 is disposed on the first axial side with respect to the first input plate 21. The second input plate 22 is disposed on the first axial side with respect to the first side plate 51.

The first input plate 21 includes a plurality of first window portions 211. Note that in the present embodiment, the first input plate 21 includes four first window portions 211. The first window portions 211 are arranged in the circumferential direction.

The second input plate 22 includes a plurality of second window portions 221. Note that in the present embodiment, the second input plate 22 includes four second window portions 221. The second window portions 221 are arranged in the circumferential direction. The second window portions 221 are disposed at locations that respectively overlap the first window portions 211 as seen in the axial direction.

The third fastening members 26 fasten the first input plate 21 to the second input plate 22. The third fastening members 26 may be rivets, for example. The third fastening members 26 are disposed on the first axial side with respect to the first side plate 51. The third fastening members 26 are disposed so as to overlap the first side plate 51 as seen in the axial direction.

Hub Flange

The hub flange 23 is configured to transmit torque from the first and second input plates 21 and 22 to a device on the output side. The hub flange 23 includes a hub 231 and a flange plate 232. Although the hub 231 and the flange plate 232 are formed integrally as one member, they may also be constituted by separate members.

The hub 231 has a tubular shape and is disposed in the center holes of the first input plate 21 and the second input plate 22. A spline hole extends axially in an inner circumferential portion of the hub 231. The input shaft 111 that is a member on the output side can be spline-engaged with this spline hole.

The flange plate 232 radially extends from an outer circumferential surface of the hub 231. The flange plate 232 has an annular shape. The flange plate 232 is disposed so as to be rotatable relative to the first input plate 21 and the second input plate 22.

The flange plate 232 is disposed between the first input plate 21 and the second input plate 22 in the axial direction. The flange plate 232 includes a plurality of housing holes 233. Note that in the present embodiment, the flange plate 232 includes four housing holes 233. The housing holes 233 are arranged in the circumferential direction. The housing holes 233 are disposed so as to overlap the first window portions 211 and the second window portions 221 as seen in the axial direction.

Elastic Member

As shown in FIG. 1 and FIG. 2, the elastic members 24 are configured to elastically couple the first and second input plates 21 and 22 and the flange plate 232 in the rotational direction. The elastic members 24 in this embodiment are coil springs, for example.

The elastic members 24 are housed in the housing holes 233 of the flange plate 232. Also, the elastic members 24 are housed in the first window portions 211 of the first input plate 21 and are also housed in the second window portions 221 of the second input plate 22.

Operation

Torque transmitted from the engine to the flywheel 10 is input to the damper unit 2 via the torque limiter 5. The torque is input to the first and second input plates 21 and 22 of the damper unit 2, and then the torque is transmitted to the hub flange 23 via the elastic members 24. Then, the torque is transmitted from the hub flange 23 to the motor, the power generator, the speed shifter, and the like on the output side.

Further, for example, when starting the engine, since the inertia amount on the output side is large, excessive torque may be transmitted from the output side to the engine. In such a case, the torque transmitted to the engine side is limited to a predetermined value or less through the torque limiter 5.

Variation

The present invention is not limited to the embodiment described above, and various alterations and modifications can be made without departing from the scope of the claimed invention. Also, one or more of the following variations can be applied simultaneously.

Figure 7:
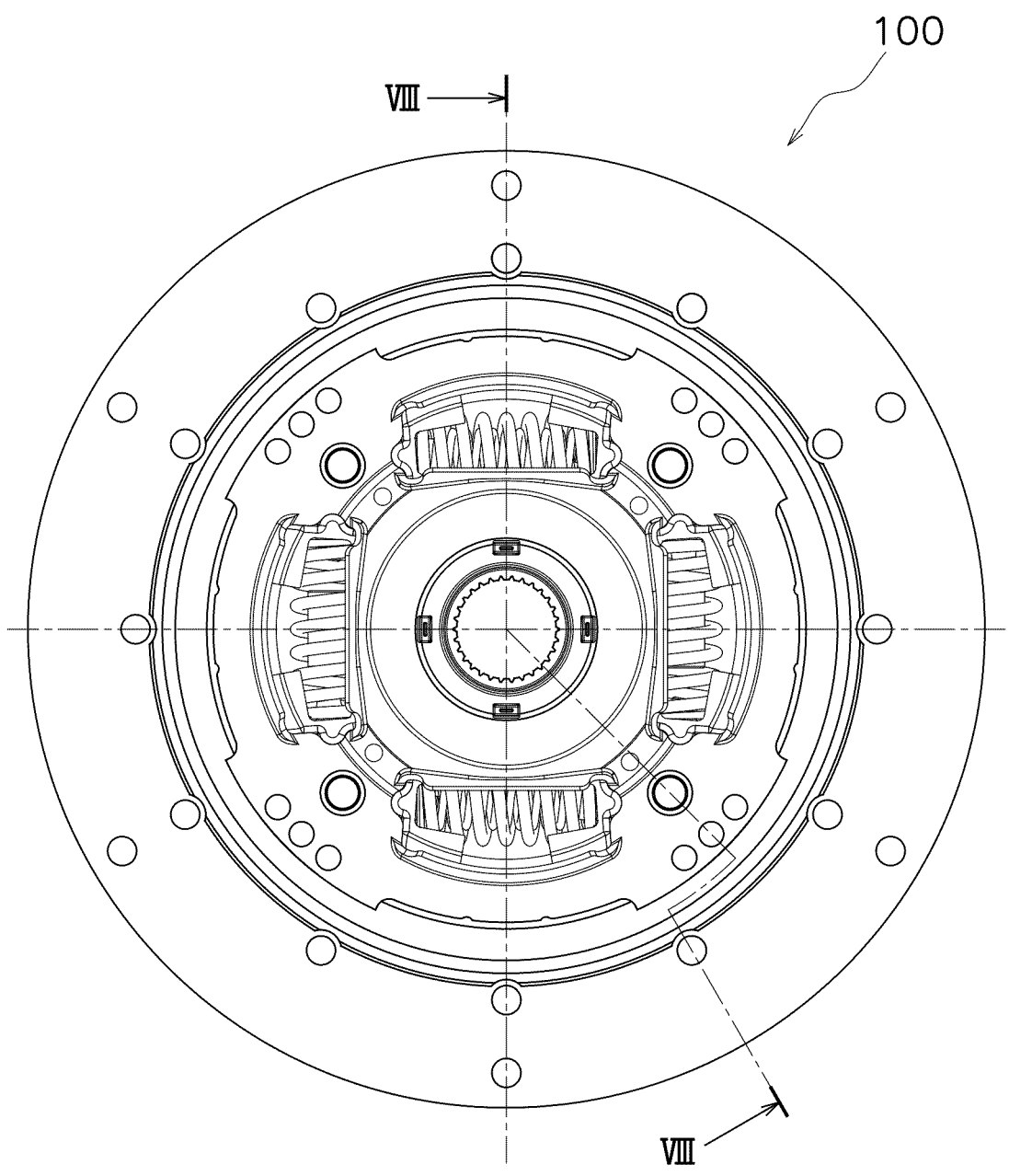
FIG. 7 is a front view of a power transmission device according to a variation of the embodiment illustrated in FIG. 1.
Figure 8:
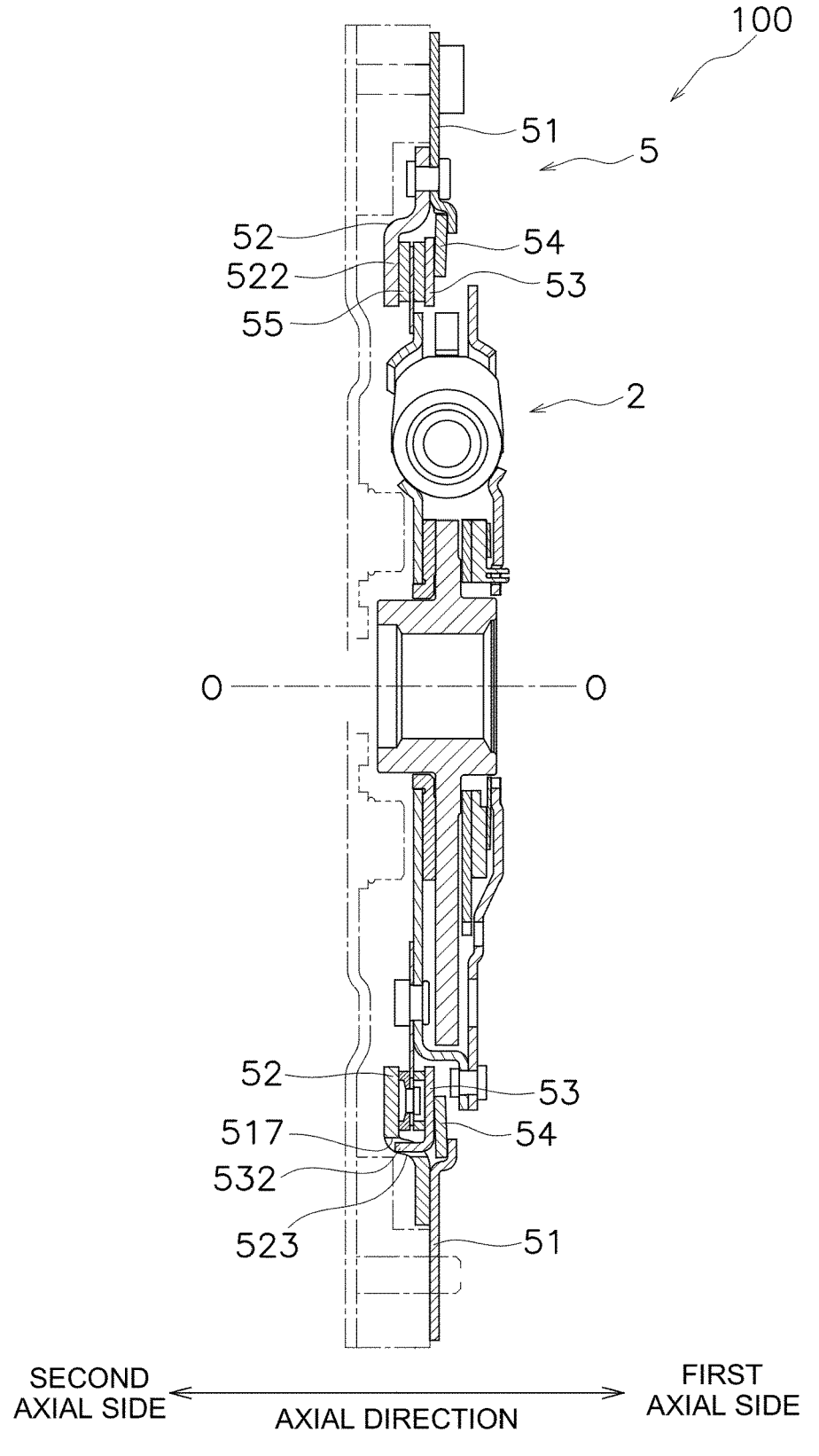
FIG. 8 is a cross-sectional view taken along the zigzag line VIII-VIII in FIG. 7.

(a) In the above embodiment, the first side plate 51 is thicker than the second side plate 52. However, the configuration of the torque limiter 5 is not limited thereto. For example, as shown in FIGS. 7 and 8, the second side plate 52 may be thicker than the first side plate 51. In this case, the second inner circumferential portion 522 of the second side plate 52 is subjected to a biasing force from the cone spring 54.

As in this variation, when the second side plate 52 is thicker than the first side plate 51, the order in which the cone spring 54, the pressure plate 53, and the friction disc 55 are arranged in the axial direction is different from the above embodiment. That is, in this variation, from the second side plate 52, the friction disc 55, the pressure plate 53, and the cone spring 54 are arranged in the stated order in the axial direction.

Also, as in this variation, when the second side plate 52 is thicker than the first side plate 51, the second side plate 52 includes the insertion holes 517. The claw portions 532 of the pressure plate 53 extend toward the second side plate 52, and are inserted into the insertion holes 517. Note that the insertion holes 517 are formed in the second coupling portion 523 of the second side plate 52.

(b) In the above embodiment, the first side plate 51 is disposed on the first axial side with respect to the second side plate 52. However, the configuration of the torque limiter 5 is not limited thereto. For example, as shown in FIGS. 9 and 10, the first side plate 51 may be disposed on the second axial side with respect to the second side plate 52.

Figure 9:
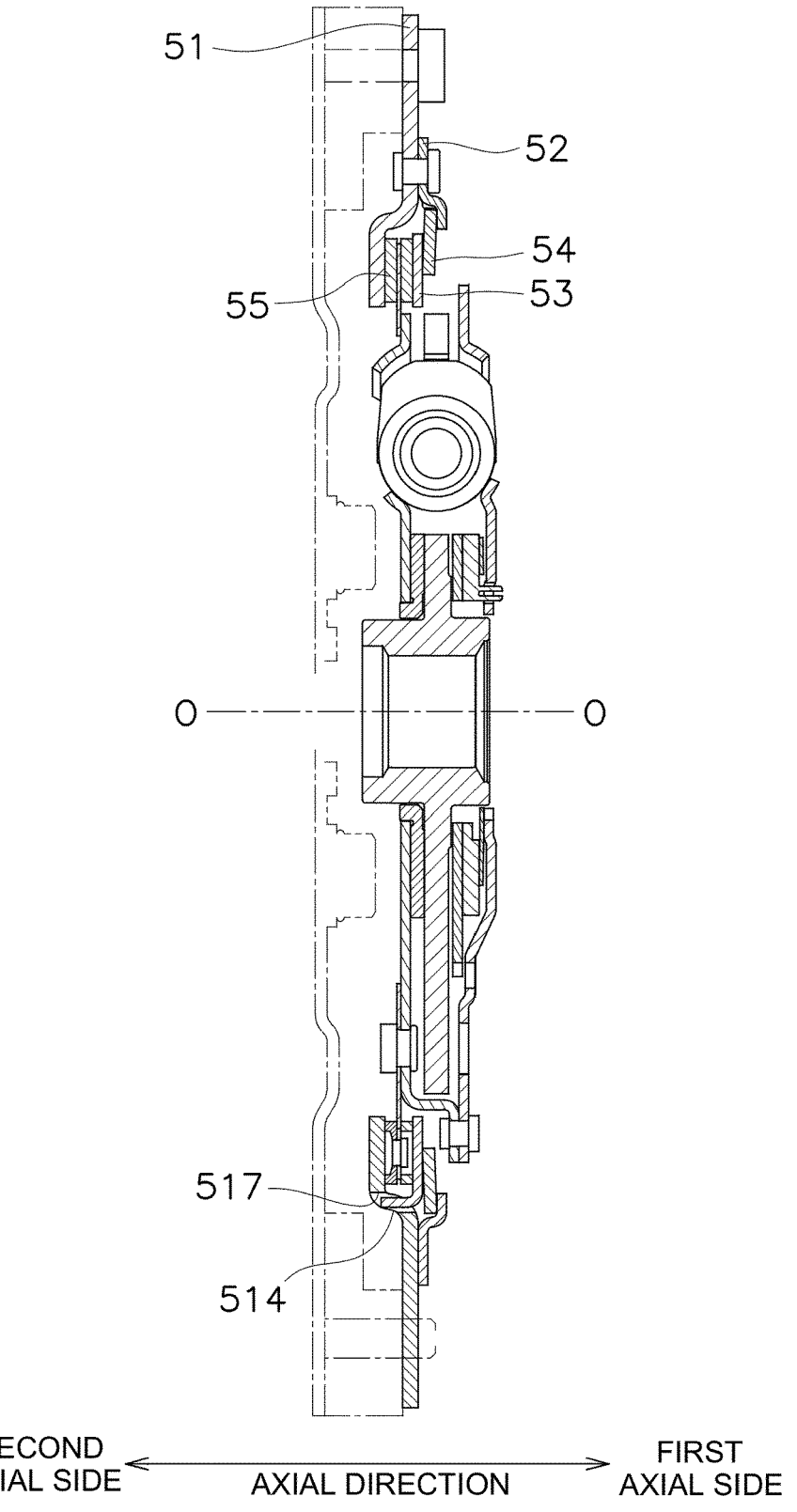
FIG. 9 is a cross-sectional view of an embodiment of a power transmission device according to a variation.

Note that, in FIG. 9, the first side plate 51 is thicker than the second side plate 52. For this reason, from the first side plate 51, the friction disc 55, the pressure plate 53, and the cone spring 54 are arranged in the stated order.

Figure 10:
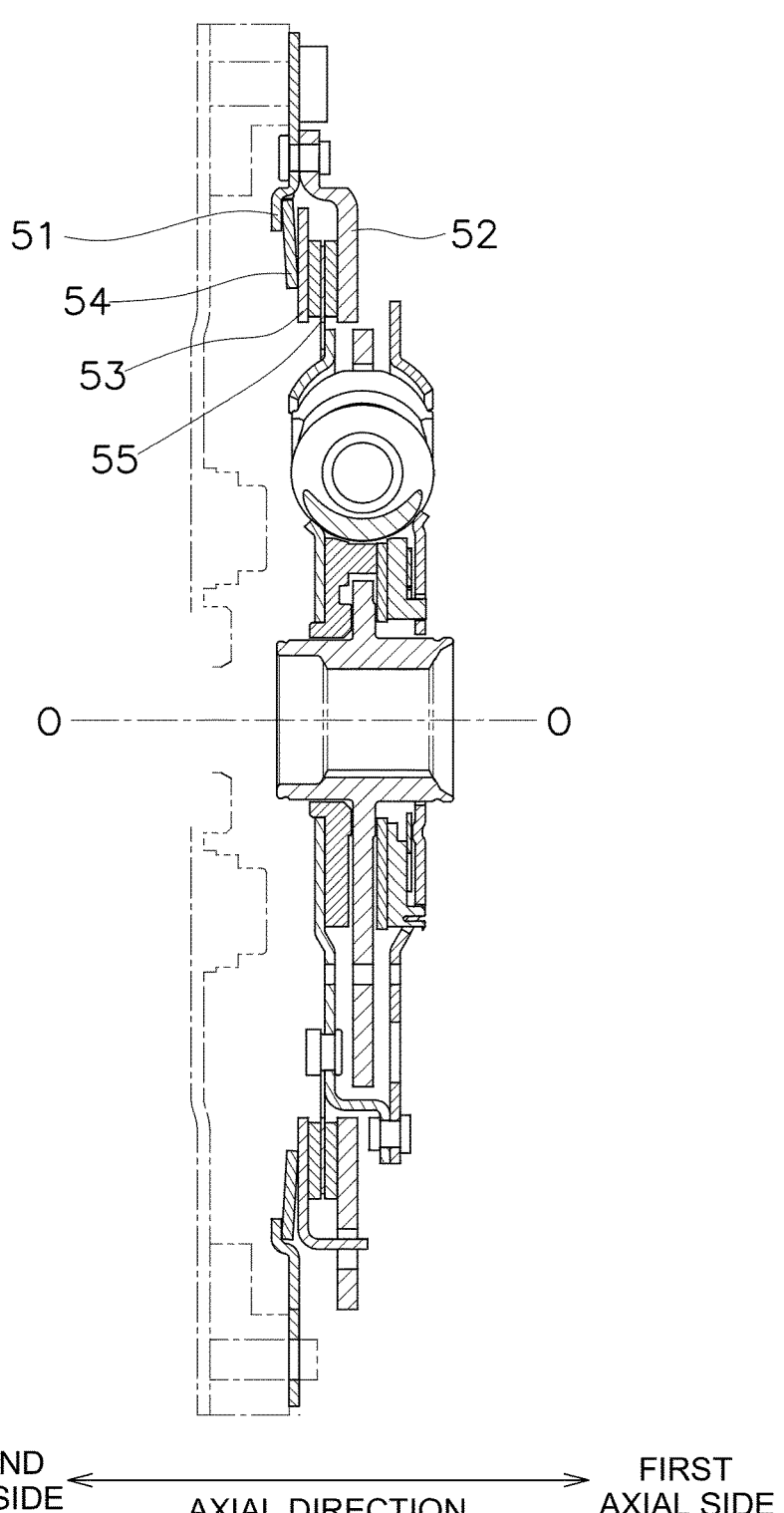
FIG. 10 is a cross-sectional view of a power transmission device according to the variation.

On the other hand, in FIG. 10, the second side plate 52 is thicker than the first side plate 51. For this reason, from the second side plate 52, the friction disc 55, the pressure plate 53, and the cone spring 54 are arranged in the stated order.

(c) In the above embodiment, the insertion holes 517 are formed in the first inner circumferential portion 513 of the first side plate 51. However, the configuration of the first side plate 51 is not limited thereto. For example, as shown in FIG. 9, the insertion holes 517 may be formed in the first coupling portion 514 of the first side plate 51.

(d) In the above embodiment, the flywheel 10 includes a plurality of members, namely, the flexible plate 11 and the inertia ring 12. However, the configuration of the flywheel 10 is not limited thereto. For example, the flywheel 10 may be integrally constituted by a single member.

(e) In the above embodiment, the fastening members 13 fasten the inner circumferential portion 121 of the inertia ring 12 to the flexible plate 11. However, the fastening positions of the fastening members 13 are not limited thereto. For example, the fastening members 13 may fasten the outer circumferential portion 122 of the inertia ring 12 to the flexible plate 11. In this case, the inertia ring 12 does not need to include the inner circumferential portion 121.

(f) In the above embodiment, the inertia ring 12 is attached to the flexible plate 11 using the fastening members 13. However, the inertia ring 12 may be attached to the flexible plate 11 through welding or the like.

(g) In the above embodiment, the first side plate 51 and the second side plate 52 are fixed to each other through the first fastening members 56. However, the first side plate 51 and the second side plate 52 may be fixed to each other through welding or the like.

LIST OF REFERENCE NUMERALS

2 Damper unit
5 Torque limiter
51 First side plate
511 Attachment surface

512 First outer circumferential portion
513 First inner circumferential portion
514 First coupling portion
515 Through hole
516 First recessed portion
517 Insertion hole
52 Second side plate
521 Second outer circumferential portion
522 Second inner circumferential portion
523 Second coupling portion
525 Second recessed portion
53 Pressure plate
532 Claw portion
54 Cone spring
55 Friction disc
56 First fastening member
10 Flywheel
11 Flexible plate
12 Inertia ring
100 Power transmission device

What is claimed is:

1. A torque limiter configured to be attached to a flywheel, the torque limiter comprising:
  a first side plate including an attachment surface, the attachment surface facing in an axial direction so as to be attached to the flywheel;
  a second side plate that has a smaller outer diameter than an outer diameter of the first side plate, the second side plate disposed so as to not overlap the attachment surface as seen in the axial direction, the second side plate attached to the first side plate;
  a friction disc disposed between the first side plate and the second side plate in the axial direction;
  a pressure plate in contact with the friction disc, the pressure plate including a claw portion extending toward the first side plate and the first side plate includes an insertion hole for insertion of the claw portion; and
  a biasing member biasing the pressure plate toward the friction disc,
  wherein the first side plate is thicker than the second side plate.

2. The torque limiter according to claim 1, further comprising a first fastening member fastening the first side plate and the second side plate to each other,
  wherein the first fastening member is disposed radially inward of the attachment surface.

3. The torque limiter according to claim 2, wherein the second side plate includes a second outer circumferential portion, a second inner circumferential portion, and a second coupling portion, the second coupling portion extending in the axial direction so as to couple the second outer circumferential portion to the second inner circumferential portion, and
    the second coupling portion includes a second recessed portion recessed radially inward, the second recessed portion opposing the first fastening member.

4. A power transmission device comprising:
the torque limiter according to claim 1, and
a damper unit attached to the torque limiter.

5. A torque limiter configured to be attached to a flywheel, the torque limiter comprising:
  a first side plate including an attachment surface, the attachment surface facing in an axial direction so as to be attached to the flywheel;
  a second side plate that has a smaller outer diameter than an outer diameter of the first side plate, the second side plate disposed so as to not overlap the attachment surface as seen in the axial direction, the second side plate attached to the first side plate;
  a friction disc disposed between the first side plate and the second side plate in the axial direction;
  a pressure plate in contact with the friction disc; and
  a biasing member biasing the pressure plate toward the friction disc; and
  a first fastening member fastening the first side plate and the second side plate to each other, wherein the first fastening member is disposed radially inward of the attachment surface, wherein
  the first side plate includes a first outer circumferential portion, a first inner circumferential portion, and a first coupling portion, the first outer circumferential portion including the attachment surface,
  the first coupling portion extends in the axial direction so as to couple the first outer circumferential portion to the first inner circumferential portion,
  the first coupling portion includes a first recessed portion recessed radially inward, and
  the first recessed portion opposes the first fastening member.

6. A power transmission device comprising:
a flywheel; and
a torque limiter including
  a first side plate including an attachment surface, the attachment surface facing in an axial direction so as to be attached to the flywheel;
  a second side plate that has a smaller outer diameter than an outer diameter of the first side plate, the second side plate disposed so as to not overlap the attachment surface as seen in the axial direction, the second side plate attached to the first side plate;
  a friction disc disposed between the first side plate and the second side plate in the axial direction;
  a pressure plate in contact with the friction disc;
  a biasing member biasing the pressure plate toward the friction disc; and
  a first fastening member fastening the first side plate and the second side plate to each other, wherein the first fastening member is disposed radially inward of the attachment surface,
  wherein the flywheel includes a flexible plate, an inertia ring attached to an outer circumferential portion of the flexible plate, and a fastening member fastening the inertia ring to the flexible plate,
  the inertia ring includes a fastening recessed portion for fastening by the fastening member, the fastening recessed portion being disposed at an inner circumferential portion of the inertia ring, and
  the first fastening member overlaps the fastening recessed portion as seen in the axial direction.

* * * * *